(12) United States Patent
Park

(10) Patent No.: US 11,958,675 B2
(45) Date of Patent: Apr. 16, 2024

(54) PTP BLISTER PACKAGING MATERIAL, PTP BLISTER PACKAGE COMPRISING THE SAME AND MANUFACTURING METHOD THEREOF

(71) Applicant: ICONIC FUSIONS CO., LTD., Pyeongtaek-si (KR)

(72) Inventor: Hyo Jin Park, Yongin-si (KR)

(73) Assignee: ICONIC FUSIONS CO., LTD., Pyeongtaek-si (KR)

( * ) Notice: Subject to any disclaimer, the term of this patent is extended or adjusted under 35 U.S.C. 154(b) by 165 days.

(21) Appl. No.: 17/735,643

(22) Filed: May 3, 2022

(65) Prior Publication Data
US 2022/0355993 A1 Nov. 10, 2022

(30) Foreign Application Priority Data
May 4, 2021 (KR) .......................... 10-2021-0057794

(51) Int. Cl.
| | |
|---|---|
| *B65D 75/36* | (2006.01) |
| *C08G 69/44* | (2006.01) |
| *C08K 3/22* | (2006.01) |
| *C08K 3/26* | (2006.01) |
| *C08K 3/36* | (2006.01) |

(52) U.S. Cl.
CPC ............. *B65D 75/36* (2013.01); *C08G 69/44* (2013.01); *C08K 3/22* (2013.01); *C08K 3/26* (2013.01); *C08K 3/36* (2013.01); *B65D 2575/36* (2013.01); *C08K 2003/2296* (2013.01); *C08K 2003/265* (2013.01)

(58) Field of Classification Search
CPC .... B65D 75/36; B65D 2575/36; C08G 69/44; C08K 3/22; C08K 3/26; C08K 3/36; C08K 2003/2296; C08K 2003/265
See application file for complete search history.

(56) References Cited

U.S. PATENT DOCUMENTS

| | | | |
|---|---|---|---|
| 5,482,667 A * | 1/1996 | Dunton .................. | B29C 70/086 156/166 |
| 5,783,273 A * | 7/1998 | Yamamoto ................ | B32B 3/04 428/35.8 |
| 2022/0275122 A1* | 9/2022 | Koda ........................ | C08J 5/249 |
| 2023/0191763 A1* | 6/2023 | Yamazaki ............... | B32B 27/36 428/423.7 |

FOREIGN PATENT DOCUMENTS

| | | |
|---|---|---|
| KR | 1020190088540 A | 7/2019 |
| KR | 102075089 B1 | 2/2020 |

* cited by examiner

*Primary Examiner* — Jacob K Ackun
(74) *Attorney, Agent, or Firm* — Rabin & Berdo, P.C.

(57) ABSTRACT

The present invention relates to a novel PTP blister packaging material, a PTP blister package comprising the same, and a method of manufacturing the same, and more particularly, to a PET-based blister package which is easy to cut and can be formed with a smooth cut surface, a blister package manufactured using the same as well as a method of manufacturing the same.

20 Claims, 3 Drawing Sheets

PTP BLISTER PACKAGING MATERIAL, PTP BLISTER PACKAGE COMPRISING THE SAME AND MANUFACTURING METHOD THEREOF

BACKGROUND

1. Field of the Invention

The present invention relates to a novel PET-based press through package (PTP) blister packaging material, a PTP blister package manufactured using the same, and a method of manufacturing the same.

2. Discussion of Related Art

There is known a package in which a plastic sheet is heat-formed to form one or a plurality of recessed spaces, the article is put therein, the opening is covered with paper, cardboard, a plastic film or sheet, an aluminum foil or the like, and the peripheral portion is adhered to a substrate. The plastic film or sheet used for this is a thermoplastic plastic, and polyvinyl chloride is mostly used. The characteristic of this packaging is that the product can be seen clearly from the molded transparent part, and instructions for use can be displayed on the opposite side of the cardboard part. Since the packaging is used for hanging electric appliances such as a battery, a razor, and a tooth brush, daily necessities, and the like on a hanger, the display effect is enhanced and since the packaging is bulky compared to the contents, it also has a pilfer-proof function. In the case of food and pharmaceuticals, heat sealing between plastics is performed because sealing is required to prevent tampering. In particular, there are many products that use a press through package (PTP) packaging method in which a thermoplastic plastic sheet is heat-molded, tablets or capsules are put in a recessed space, and the opening is heat-sealed with a material coated with a heat-sealing agent on aluminum, and when used, packaged tablets, capsules, foods and the like are taken out by pressing from the plastic side and passing them through an aluminum foil.

The global market for blister packaging, a type of PTP packaging, reached more than USD 20.1 billion in 2019, and the CAGR for 2018-2028 is predicted to be 6.35%, and the size is continuously expanding.

Blister packaging is a molding method in which a thin plastic sheet (or film) processed in the form of a roll is heated and the heated plastic film is attached to a mold to form the shape of the packaging material, which is the most representative production process of the production of plastic packaging containers in which in terms such as vacuum molding, etc. are frequently used in the country. For blister packaging, a vacuum molding machine is used, a heated plastic resin is put therein, and the heated sheet is brought into close contact with a mold mounted in the molding machine to bring the inside into a vacuum state, and then air is rapidly blown into the mold to mold a product. In addition, the molded product undergoes a cooling process, and a cutting process of cutting the molded product is required for release (or demolding/removing the molded product from the mold). In addition, in the case of vacuum molding, it is necessary to manufacture not only the shape of the mold but also a separate knife plate for mold release (cutting) in accordance with the form of the molded article, and as the main resin used for molding, low cost polyvinyl chloride (PVC) has been widely used, which has the advantage that it can be easily cut with a small force (see FIG. 1), but has the problem that a harmful component is generated, so a PET web has been developed.

However, as shown by photographs in FIG. 2A, FIG. 2B and FIG. 2C, the PTP blister packaging material of the PET raw fabric is not cut well when bent dozens of times, and even if a part of the cut is partially cut by applying a strong force, the cut surface is not clean, and there is a problem of a hand being cut or injured, for example, in the case of a PTP blister packaging material for food such as gum or chocolate, cuts or injuries frequently occur when children take out food from the packaging material.

Accordingly, there is an increasing demand for a PET fabric for PTP blister package that can be easily cut like PVC when an appropriate force is applied and can form a clean cut surface when cut.

RELATED ART DOCUMENT

Patent Document (Patent Document 0001) Korean Patent Registration No. 10-2075089 (published on Feb. 7, 2020)
(Patent Document 0002) Korean Patent Publication No. 10-2019-0088540 (published on Jul. 26, 2019)

SUMMARY OF THE INVENTION

The present invention relates to a PTP blister packaging material including an optimal composition and an optimum composition ratio as a packaging material of a new material which solves the problem of existing PET-based PTP blister packaging materials being difficult to cut and having a sharp cut surface, a method of manufacturing the same, and a blister package including the same.

In order to solve the above problems, the PTP blister packaging material of the present invention includes a PET-based copolymer having an intrinsic viscosity of 0.70 to 0.78 dl/gr, a PET-based copolymer having an intrinsic viscosity of 0.80 to 0.85 dl/gr, and a master batch.

Another object of the present invention is to provide a blister package manufactured by processing the packaging material.

Another object of the present invention is to provide a method of manufacturing the PTP blister packaging material and/or package.

The blister packaging material in the form of a sheet or a film made of the PTP blister packaging material of the present invention is easily cut without applying excessive force, and in particular, it is possible to prevent a user from being injured by a sharp cut surface in advance because the cut surface is not formed sharply, and to provide a blister package having high marketability as an environmentally friendly material capable of being recycled.

DETAILED DESCRIPTION OF EXEMPLARY EMBODIMENTS

Figure 1:
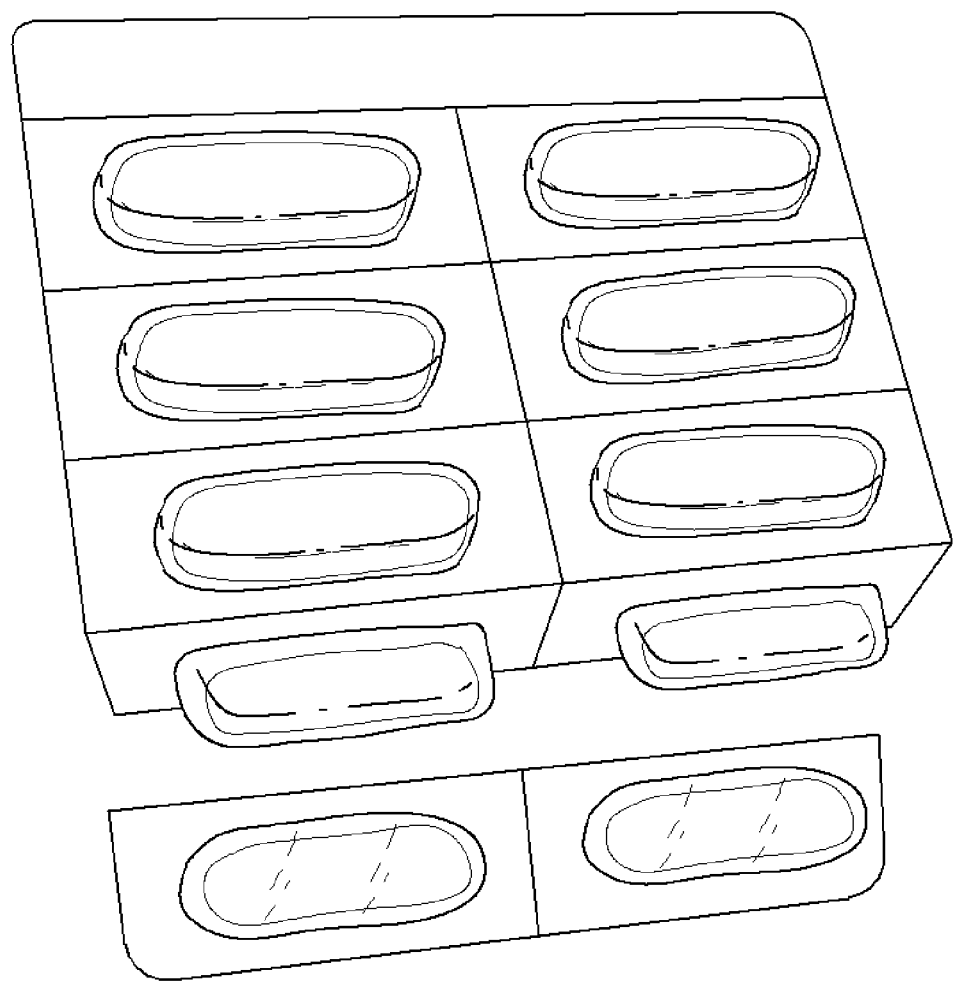
FIG. 1 is a photograph of a product packaged in a PTP blister packaging material made of general polyvinyl chloride material cut by hand.
Figure 2A:
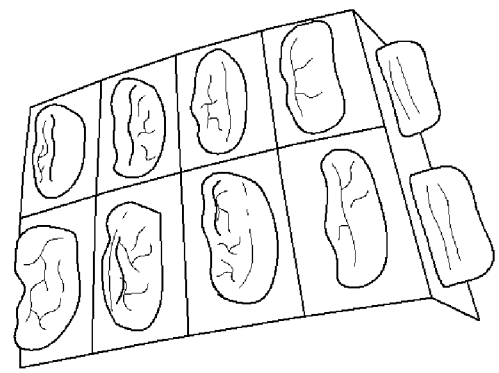
FIG. 2A, FIG. 2B and FIG. 2C are, respectively, a photograph of a product packaged in a PTP blister packaging material made of conventional PET material cut by hand.
Figure 2B:
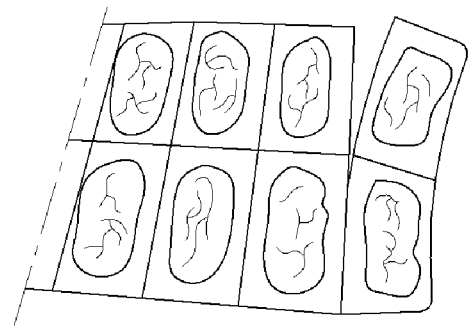
Figure 2C:
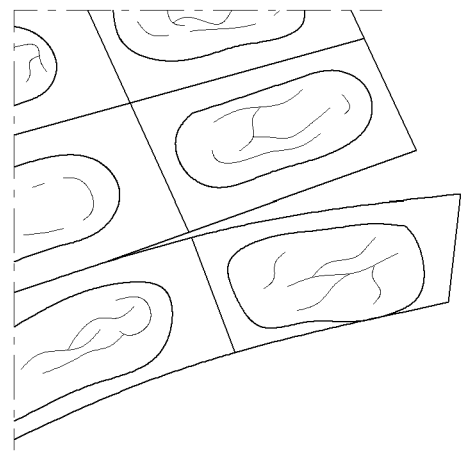

Hereinafter, the PTP blister packaging material of the present invention will be described in more detail.

The PTP blister packaging material of the present invention is manufactured by introducing two types of PET-based copolymer resins having different intrinsic viscosities, specifically, a first resin including the PET-based copolymer having low intrinsic viscosity, a second resin including the PET-based copolymer having high intrinsic viscosity and a master batch are included.

The PET-based copolymer of the first resin and the second resin has an intrinsic viscosity difference of 0.02 to 0.06 dl/gr, preferably 0.03 to 0.05 dl/gr, and more preferably 0.04 to 0.05 dl/gr. At this time, when the intrinsic viscosity difference exceeds 0.06 dl/gr, mechanical properties required as a PTP blister packaging material may be lowered, and when the intrinsic viscosity difference is less than 0.02 dl/gr, there may be a problem in that the cut surface of the blister package manufactured with the packaging material of the present invention is not smooth, so it is preferable to use a PET resin having an intrinsic viscosity difference within the above range.

The low intrinsic viscosity PET-based copolymer of the first resin may include a copolymer of isophthalic acid, terephthalic acid and a ($C_1$-$C_5$ alkylene)diol, preferably a copolymer of isophthalic acid, terephthalic acid and a ($C_2$-$C_4$ alkylene)diol, more preferably a copolymer of isophthalic acid, terephthalic acid, and a ($C_2$-$C_3$ alkylene)diol.

The low intrinsic viscosity PET-based copolymer has an intrinsic viscosity of 0.70 to 0.78 dl/gr, preferably 0.72 to 0.78 dl/gr, and more preferably 0.745 to 0.765 dl/gr. At this time, when the intrinsic viscosity is less than 0.70 dl/gr, there may be a problem in that the mechanical properties of the PTP blister packaging material are lowered, and when the intrinsic viscosity exceeds 0.78 dl/gr, there is little difference in intrinsic viscosity from the second resin, and a packaging material to be produced cannot be produced, and therefore it is preferable to use a PET-based copolymer having an intrinsic viscosity within the above range. In addition, the first resin may have a thermal decomposition temperature of 300° C. or higher, a melting point of 240° C. or higher, and a relative density of 1.36 to 1.50 gr/cm$^3$, preferably a relative density of 1.38 to 1.46 gr/cm$^3$.

In the PTP blister packaging material composition, the high intrinsic viscosity PET-based copolymer of the second resin includes a copolymer of isophthalic acid, terephthalic acid, and ethylene glycol, and may have a thermal decomposition temperature of 300° C. or higher, a melting point of 240° C. or higher, and a relative density of 1.38 to 1.40 gr/cm$^3$. The high intrinsic viscosity of the PET-based copolymer may be 0.80 to 0.85 dl/gr, preferably 0.80 to 0.82 dl/gr.

The master batch in the composition of the PTP blister packaging material serves to change the curing and breaking properties of the first resin and the second resin blend, and may include a dispersant, a disintegrant, and a PET-based copolymer.

Among the master batch components, the dispersant serves to blend the PTP blister packaging material composition well and is used for adsorption of materials, and may include at least one selected from ZnO, polyethylene wax, and a surfactant, preferably, at least one selected from ZnO and polyethylene wax.

In addition, the content of the dispersant may included in an amount of 0.5 to 2.0 wt %, preferably 0.5 to 1.5 wt %, more preferably 0.7 to 1.2 wt %, based on the total weight of the master batch. At this time, when the content of the dispersant is less than 0.5 wt %, since the amount used is too small, there may be a problem of insufficient miscibility in the mixed product, and the use of a dispersant content of more than 2 wt % is excessive use, and rather, a problem of lowering the flexibility of the PTP blister packaging material may be caused, and therefore, it is preferably used within the above range.

Among the components of the master batch, the disintegrant serves to well break and smooth the cut surface, and may be included in an amount of 0.5 to 3.0 wt %, preferably 0.6 to 2.0 wt %, more preferably 0.8 to 1.5 wt %, based on the total weight of the master batch. At this time, when the content of the disintegrant is less than 0.5 wt %, the use amount thereof is too small to have an effect of smoothing the cut surface, and the use of a disintegrant content of more than 3.0 wt % is excessive use, and rather, there may be a problem of lowering production due to breakage at the time of film production of the PTP blister packaging material, and therefore it is preferably used within the above range.

In addition, the disintegrant may include a polymer prepared by polymerizing dicumyl peroxide, sodium powder, zinc powder, zeolite powder, calcium carbonate and ($C_1$-$C_4$ alkylene)bisstearamide, preferably a polymer manufactured by polymerizing 5 to 8 wt % of dicumyl peroxide, 3 to 6 wt % of sodium powder, 5 to 10 wt % of zinc powder, 8 to 12 wt % of zeolite powder, 0.1 to 1.0 wt % of calcium carbonate and the remainder as ($C_1$-$C_4$ alkylene)bisstearamide, more preferably a polymer manufactured by polymerizing 6 to 8 wt % of dicumyl peroxide, 3 to 5 wt % of sodium powder, 5 to 8 wt % of zinc powder, 10 to 12 wt % of zeolite powder, 0.1 to 0.5 wt % of calcium carbonate and the remainder as ($C_2$-$C_3$ alkylene)bisstearamide.

In addition, as the PET-based copolymer among the master batch components, it is preferable to use a high intrinsic viscosity PET-based copolymer of the second resin.

The blister packaging material of the present invention may include 18 to 25 wt % of the second resin, 5 to 15 wt % of the master batch and the remainder as the first resin, preferably 18.5 to 23.5 wt % of the second resin, 7.5 to 12.5 wt % of the master batch and the remainder as the first resin, more preferably 19.0 to 22.0 wt % of the second resin, 8.0 to 12.0 wt % of the master batch and the remainder as the first resin. At this time, when the content of the second resin is less than 18 wt % or exceeds 25 wt %, there may be a problem in that the mechanical properties of the manufactured PTP blister packaging material are not good or the cut surface is not smooth. In addition, when the master batch content is less than 5 wt %, there may be a problem that breakage is difficult, and when it is more than 15 wt % it is preferable to use it within the above-mentioned range because there may be a problem in that the production is lowered due to breakage during production due to excessive use.

The PTP blister packaging material of the present invention may further include additives such as plasticizers, sunscreens, antioxidants, strength enhancers, flame retardants, and impact modifiers within the range that does not reduce physical properties in addition to the first resin, second resin and master batch described above.

The blister package of the present invention may be in the form of a film or sheet obtained by molding the above-described PTP blister packaging material.

In addition, the blister package consists of a receiving part for accommodating a packaging object, a flat part, and a cover package, and the cover package may include a film or sheet made of the PTP blister packaging material of the present invention.

In addition, the cover package may further include an airtight layer, a printing layer, etc. on the upper and/or lower portion of the PTP blister packaging material forming the film or sheet.

The flat part may include aluminum foil, etc.

Figure 3:
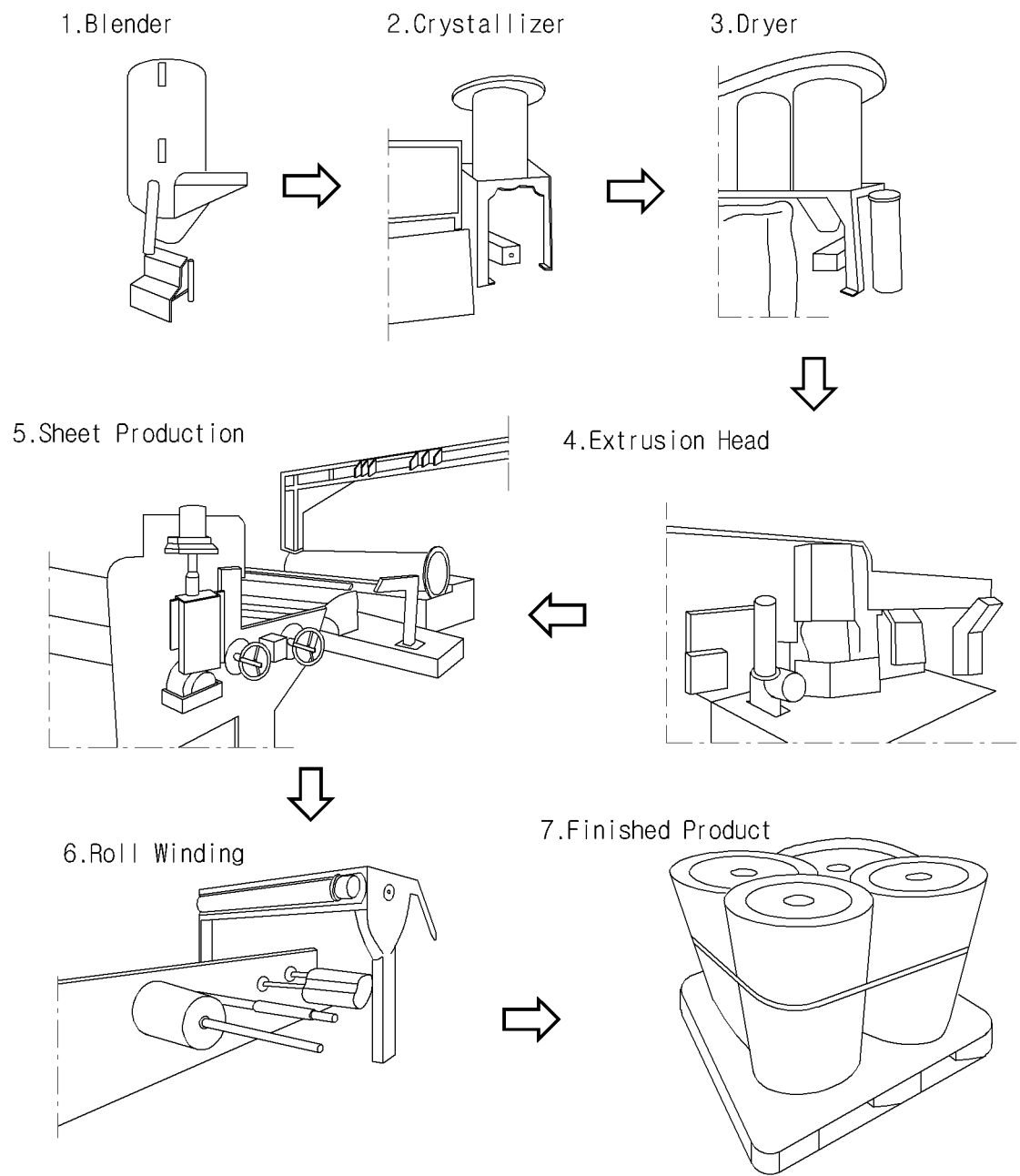
FIG. 3 is a photograph showing a process of manufacturing the PTP blister package in the form of a film (or sheet) of the present invention.

More specifically, as shown in the photograph of the manufacturing process in FIG. 3, the method of the present invention is capable of manufacturing a blister molded article in the form of a film or sheet by carrying out a process including: a first step of manufacturing a blend by blending the PTP blister packaging material described above; a second step of performing a crystallization process after putting the blend in a crystallizer; a third step of performing a drying process after putting the blend subjected to the crystallization process into a dryer; and a fourth step of manufacturing a film- or sheet-formed molded article by performing a molding process on the blend subjected to the drying process.

In addition, it may further include a process including a fifth step of packaging by rolling (rolling) the molded article of the fourth step.

The composition and composition ratio of the PTP blister packaging material of the first step are as described above.

The crystallization process of the second step is a process performed to prevent the raw material from being fused inside the hopper in the drying process, and it can be carried out under a floor heater temperature of 200 to 230° C., preferably 210 to 230° C., more preferably 220 to 230° C. for 2 to 6 hours, preferably 3 to 5 hours. At this time, when the temperature of the blower heater is less than 200° C., there may be a problem that the raw materials are agglomerated in the drying process, and when the temperature of the blower heater exceeds 230° C., since there may be a problem that the first resin and/or the second resin in the PTP blister packaging material component is thermally decomposed, it is better to perform the crystallization process within the above range.

The drying of the third step is a process for removing moisture from the raw materials, and it is preferable to perform it for about 30 minutes to 2 hours at 120 to 180° C., preferably at 120 to 160° C. At this time, when the drying process temperature is less than 120° C., there is a problem that the process time is too long and productivity is lowered, and when the drying process temperature exceeds 180° C., since there may be a problem that the raw material is carbonized to generate black spots, stains, etc., it is preferable to perform the drying step in the above temperature range.

The molding process of the fourth step can be performed by a general molding method used in the art, and for example, extrusion molding can be carried out at an extrusion head temperature of 250 to 290° C., a T-die temperature of 230 to 270° C., and a pressure of 10 to 14 kgf/cm² to manufacture a sheet or film.

The blister package in the form of a film or sheet of the present invention manufactured using the PTP blister packaging material described above has an excellent breaking point property and is easy to cut like the existing PVC blister package and has a smooth cut surface.

The PTP blister package manufactured using the sheet-shaped blister package of the present invention can satisfy a tensile strength of 600 kg/cm² or more, preferably 600 to 700 kg/cm², when measured according to ASTM D1708.

In addition, the PTP blister package manufactured using the sheet-shaped blister package can satisfy an impact strength of 3.7 kg cm/cm or more, preferably 3.9 to 5.0 kg cm/cm, more preferably 3.9 to 4.7 kg cm/cm, when measured according to the ASTM D256 method.

In addition, the PTP blister package manufactured using the sheet-shaped blister package has a thermal conductivity of $(6.5$ to $8.0) \times 10^4/°$ C., preferably $(6.5$ to $7.7) \times 10^4/°$ C., more preferably $(6.5$ to $7.5) \times 10^4/°$ C., when measured according to the ASTM D177 method.

In addition, the PTP blister package manufactured by using the sheet-shaped blister package may satisfy a breaking point of 25 to 35%, preferably 27 to 34%, when measured according to ISO527.

Hereinafter, the present invention will be described in more detail through examples, but the following examples are not intended to limit the scope of the present invention and should be construed as aiding the understanding of the present invention.

EXAMPLES

Example 1: Manufacture of PTP Blister Packaging Material and Sheet-Shaped Package (1) Manufacture of PTP Blister Packaging Material A first resin including a PET-based copolymer (thermal decomposition temperature: 300° C. or higher, melting point: 240° C. or higher, relative density: 1.38 to 1.46 gr/cm³) having an intrinsic viscosity of 0.76 dl/gr manufactured by copolymerizing isophthalic acid, terephthalic acid, and a (C2-C3 alkylene)diol was manufactured.

A second resin including a PET-based copolymer (thermal decomposition temperature: 300° C. or higher, melting point: 240° C. or higher, relative density: 1.38 to 1.40 gr/cm³) having an intrinsic viscosity of 0.80 dl/gr manufactured by copolymerizing isophthalic acid, terephthalic acid, and ethylene glycol diol was manufactured.

A masterbatch was manufactured by mixing and stirring 1 wt % of ZnO as a dispersant, 1 wt % of a disintegrant, and the remainder as a PET-based copolymer having an intrinsic viscosity of 0.80 dl/gr.

The disintegrant includes a polymer manufactured by polymerizing 7.2 wt % of dicumyl peroxide, 3.8 wt % of sodium powder, 6.2 wt % of zinc powder, 11.3 wt % of zeolite powder, 0.4 wt % of calcium carbonate and the remainder as ethylene bisstearamide.

Next, 20 wt % of the second resin, 10 wt % of the master batch, and the remainder as the first resin were put into a blender, and then blended for 20 minutes to manufacture a PTP blister packaging material (specific gravity 1.25 to 1.40) (See FIG. 3).

(2) Manufacture of Sheet-Shaped Blister Package

After the PTP blister packaging material, that is, the blend was put into a crystallizer, a crystallization process was performed at a blower heater temperature of 225 to 230° C. for 4 hours.

Next, the blend subjected to the crystallization process was put into a dryer, and then dried at 140° C. for 1 hour.

Next, the blend subjected to the drying process was subjected to extrusion molding at an extrusion head temperature of 270° C., a T-die temperature of 250° C. and a pressure of 11 to 12 kgf/cm² to manufacture a sheet-shaped blister package.

Next, a finished product was manufactured by performing roll winding (rolling) on the sheet manufactured by performing the extrusion molding process (see FIG. 3).

Examples 1-6 and Comparative Examples 1-6

A sheet-shaped PTP blister package was manufactured in the same manner as in Example 1, but as shown in Table 1 below, the PTP blister packaging material was manufactured with different compositions and composition ratios of the first resin, the second resin, and the master batch used for the manufacture of the packaging material, and then a sheet-shaped PTP blister package was manufactured using this, and Examples 2 to 6 and Comparative Examples 1 to 6 were each carried out.

In this case, the PET copolymer constituting the second resin of Comparative Example 5 had an intrinsic viscosity of 0.86 dl/gr, and the second resin of Comparative Example 6 was the same as the first resin.

TABLE 1

| Classification | First resin PET copolymer intrinsic viscosity (dl/gr) | First resin Content (wt %) | Second resin PET copolymer intrinsic viscosity (dl/gr) | Second resin Content (wt %) | Master batch Content (wt %) | The difference in intrinsic viscosity between the first resin and the second resin (dl/gr) |
|---|---|---|---|---|---|---|
| Example 1 | 0.76 | 70 wt % | 0.80 | 20 wt % | 10 wt % | 0.04 |
| Example 2 | 0.76 | 70 wt % | 0.80 | 18.5 wt % | 10 wt % | 0.04 |
| Example 3 | 0.76 | 70 wt % | 0.80 | 23.5 wt % | 10 wt % | 0.04 |
| Example 4 | 0.76 | 70 wt % | 0.80 | 20 wt % | 7.5 wt % | 0.04 |
| Example 5 | 0.76 | 70 wt % | 0.80 | 20 wt % | 12.5 wt % | 0.04 |
| Example 6 | 0.76 | 70 wt % | 0.82 | 20 wt % | 10 wt % | 0.06 |
| Comparative Example 1 | 0.76 | 70 wt % | 0.80 | 17.5 wt % | 10 wt % | 0.04 |
| Comparative Example 2 | 0.76 | 70 wt % | 0.80 | 25.5 wt % | 10 wt % | 0.04 |
| Comparative Example 3 | 0.76 | 70 wt % | 0.80 | 20 wt % | 4.5 wt % | 0.04 |
| Comparative Example 4 | 0.76 | 70 wt % | 0.80 | 20 wt % | 15.5 wt % | 0.04 |
| Comparative Example 5 | 0.76 | 70 wt % | 0.86 | 20 wt % | 10 wt % | 0.10 |
| Comparative Example 6 | 0.76 | 70 wt % | 0.76 | 20 wt % | 10 wt % | 0 |

Experimental Example Measurement of Physical Properties

The specific gravity, tensile strength, impact strength, thermal conductivity, and breaking point of the PTP blister packages manufactured in Examples 1 to 6 and Comparative Examples 1 to 6 were measured, and the results are shown in Table 2 below.

In this case, the tensile strength is measured according to ASTM D1708 method. Impact strength is measured according to ASTM D256 method. Thermal conductivity is measured according to ASTM D177 method. The breaking point is measured according to ISO527.

TABLE 2

| Classification | Tensile Strength (kg/cm$^2$) | Impact Strength (kg · cm/cm) | Thermal Conductivity ($10^4$/° C.) | Breaking Point (%) |
|---|---|---|---|---|
| Example 1 | 650 | 4.4 | 6.9 | 30 |
| Example 2 | 627 | 3.9 | 7.0 | 29 |
| Example 3 | 668 | 4.7 | 6.7 | 32 |
| Example 4 | 665 | 4.6 | 7.1 | 33 |
| Example 5 | 641 | 4.2 | 6.8 | 27 |
| Example 6 | 632 | 4.0 | 7.1 | 28 |
| Comparative Example 1 | 616 | 3.4 | 7.2 | 24 |
| Comparative Example 2 | 670 | 4.6 | 6.5 | 37 |
| Comparative Example 3 | 675 | 4.8 | 7.2 | 39 |
| Comparative Example 4 | 634 | 4.0 | 6.6 | 19 |
| Comparative Example 5 | 593 | 3.6 | 7.5 | 20 |
| Comparative Example 6 | 675 | 4.8 | 6.4 | 36 |

Looking at the physical property measurement results in Table 2, it was confirmed that the sheet-shaped package manufactured with the PTP blister packaging material of the present invention has a tensile strength of 600 to 700 kg/cm$^2$, an impact strength of 3.9 to 5.0 kg cm/cm, and a thermal conductivity of (6.5 to 7.5)×$10^4$/° C. and a suitable breaking point of about 25 to 35% (measured by ISO527).

On the other hand, in the case of Comparative Example 1 in which the content of the second resin was less than 18 wt %, there was a problem in that mechanical properties were relatively significantly decreased, and in the case of Comparative Example 2 in which more than 25 wt % of the second resin was used, when compared with Examples 1 and 3, although tensile strength was excellent, the breaking point was too high and there was no effect of increasing the impact strength, and the cut surface of the packaging material was not smooth.

In addition, in the case of Comparative Example 3 in which the content of master batch was less than 5 wt %, there was a problem in that the breaking point rapidly increased when compared with Example 4, and as a result, there was a problem in that the breakage of the package was not good.

In addition, in the case of Comparative Example 4 in which the content of master batch was more than 15 wt %, when compared with Example 5, there was a problem in that productivity was not good because the breaking point was rather low.

In the case of Comparative Example 5 in which the intrinsic viscosity difference between the first resin and the second resin exceeded 0.06 dl/gr, when compared with Examples 1 and 6, although thermal conductivity was excellent, there was a problem in that the mechanical properties of tensile strength, impact strength and breaking point were greatly reduced.

In addition, in the case of Comparative Example 6 without the intrinsic viscosities of the first resin and the second resin, there was a problem that the breaking point was very high, and the cut surface of the package was not smooth.

Through the above Examples and Experimental Examples, since the PTP blister package manufactured using the PTP blister packaging material of the present invention has excellent mechanical properties and has a breaking point in an appropriate range, it was confirmed that the cut surface was formed smoothly.

What is claimed is:

1. A press through package (PTP) blister packaging material, comprising:
    a first resin comprising a PET-based copolymer having an intrinsic viscosity of 0.70 to 0.78 dl/gr,
    a second resin comprising a PET-based copolymer having an intrinsic viscosity of 0.80 to 0.85 dl/gr, and
    a master batch.

2. The PTP blister packaging material of claim 1, wherein the PET-based copolymers of the first resin and the second resin have an intrinsic viscosity difference of 0.06 to 0.02 dl/gr.

3. The PTP blister packaging material of claim 1, wherein the PET-based copolymer of the first resin comprises a copolymer of isophthalic acid, terephthalic acid, and a ($C_1$-$C_5$ alkylene) diol, and
    the PET-based copolymer of the second resin comprises a copolymer of isophthalic acid, terephthalic acid and ethylene glycol diol.

4. The PTP blister packaging material of claim 1, wherein the PET-based copolymer of the first resin has a thermal decomposition temperature of 300° C. or higher, a melting point of 240° C. or higher, and a relative density of 1.36 to 1.50 gr/cm$^3$, and
    the PET-based copolymer of the second resin has a thermal decomposition temperature of 300° C. or higher, a melting point of 240° C. or higher, and a relative density of 1.38 to 1.40 gr/cm$^3$.

5. The PTP blister packaging material of claim 1, comprising 18 to 25 wt % of the second resin, 5 to 15 wt % of the master batch, and the remainder as the first resin.

6. The PTP blister packaging material of claim 1, wherein the master batch comprises a dispersant at 0.5 to 2.0 wt %, a disintegrant at 0.5 to 3.0 wt %, and the remainder as a PET-based copolymer resin, and
    the PET-based copolymer resin is the same resin as the second resin.

7. The PTP blister packaging material of claim 6, wherein the dispersant comprises one or more selected from ZnO, polyethylene wax, and a surfactant, and
the disintegrant comprises a polymer manufactured by polymerizing dicumyl peroxide, sodium powder, zinc powder, zeolite powder, calcium carbonate and ($C_1$-$C_4$ alkylene)bisstearamide.

8. The PTP blister packaging material of claim 7, wherein the polymer is manufactured by polymerizing 5 to 8 wt % of dicumyl peroxide, 3 to 6 wt % of sodium powder, 5 to 10 wt % of zinc powder, 8 to 12 wt % of zeolite powder, 0.1 to 1.0 wt % of calcium carbonate and the remainder as ($C_1$-$C_4$ alkylene)bisstearamide.

9. A PTP blister package in the form of a film or sheet processed from the PTP blister packaging material of claim 1.

10. A method of manufacturing a PTP blister package, comprising:
    a first step of manufacturing a blend by blending the PTP blister packaging material of claim 1;
    a second step of performing a crystallization process after putting the blend in a crystallizer;
    a third step of performing a drying process after putting the blend subjected to the crystallization process into a dryer;
    a fourth step of manufacturing a film- or sheet-formed molded article by performing a molding process on the blend subjected to the drying process; and
    a fifth step of packaging by rolling the molded article.

11. A PTP blister package in the form of a film or sheet processed from the PTP blister packaging material of claim 2.

12. A PTP blister package in the form of a film or sheet processed from the PTP blister packaging material of claim 3.

13. A PTP blister package in the form of a film or sheet processed from the PTP blister packaging material of claim 4.

14. A PTP blister package in the form of a film or sheet processed from the PTP blister packaging material of claim 5.

15. A PTP blister package in the form of a film or sheet processed from the PTP blister packaging material of claim 6.

16. A method of manufacturing a PTP blister package, comprising:
    a first step of manufacturing a blend by blending the PTP blister packaging material of claim 2;
    a second step of performing a crystallization process after putting the blend in a crystallizer;
    a third step of performing a drying process after putting the blend subjected to the crystallization process into a dryer;
    a fourth step of manufacturing a film- or sheet-formed molded article by performing a molding process on the blend subjected to the drying process; and
    a fifth step of packaging by rolling the molded article.

17. A method of manufacturing a PTP blister package, comprising:
    a first step of manufacturing a blend by blending the PTP blister packaging material of claim 3;
    a second step of performing a crystallization process after putting the blend in a crystallizer;
    a third step of performing a drying process after putting the blend subjected to the crystallization process into a dryer;

a fourth step of manufacturing a film- or sheet-formed molded article by performing a molding process on the blend subjected to the drying process; and a fifth step of packaging by rolling the molded article.

18. A method of manufacturing a PTP blister package, comprising:

a first step of manufacturing a blend by blending the PTP blister packaging material of claim 4;

a second step of performing a crystallization process after putting the blend in a crystallizer;

a third step of performing a drying process after putting the blend subjected to the crystallization process into a dryer;

a fourth step of manufacturing a film- or sheet-formed molded article by performing a molding process on the blend subjected to the drying process; and a fifth step of packaging by rolling the molded article.

19. A method of manufacturing a PTP blister package, comprising:

a first step of manufacturing a blend by blending the PTP blister packaging material of claim 5;

a second step of performing a crystallization process after putting the blend in a crystallizer;

a third step of performing a drying process after putting the blend subjected to the crystallization process into a dryer;

a fourth step of manufacturing a film- or sheet-formed molded article by performing a molding process on the blend subjected to the drying process; and a fifth step of packaging by rolling the molded article.

20. A method of manufacturing a PTP blister package, comprising:

a first step of manufacturing a blend by blending the PTP blister packaging material of claim 6;

a second step of performing a crystallization process after putting the blend in a crystallizer;

a third step of performing a drying process after putting the blend subjected to the crystallization process into a dryer;

a fourth step of manufacturing a film- or sheet-formed molded article by performing a molding process on the blend subjected to the drying process; and a fifth step of packaging by rolling the molded article.

\* \* \* \* \*